H. HENRICKS.
WRENCH.
APPLICATION FILED MAR. 1, 1910.
961,296.
Patented June 14, 1910.
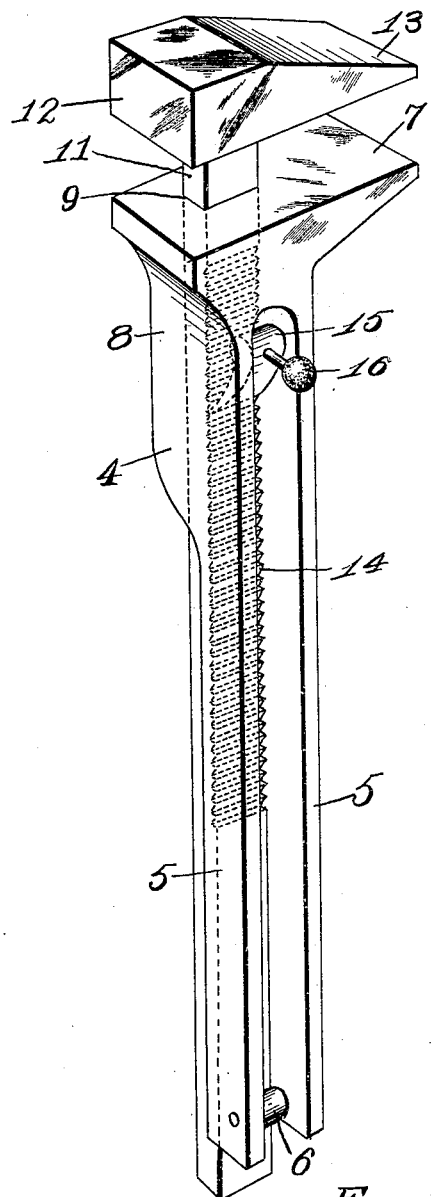
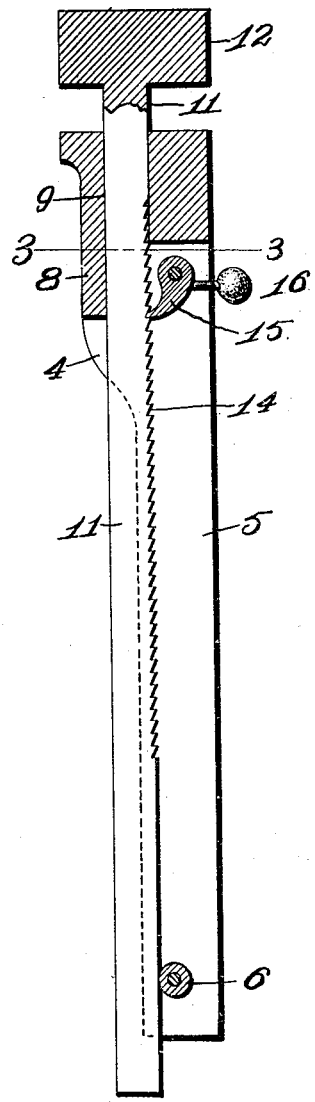
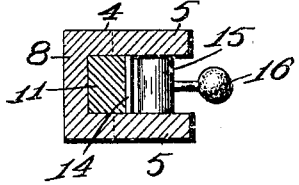
Witnesses
W. C. Stein
L. A. L. McIntyre
Inventor
Henry Henricks
by Hopkins & Eicks Attys.

UNITED STATES PATENT OFFICE.

HENRY HENRICKS, OF VALLEY PARK, MISSOURI.

WRENCH.

961,296.  Specification of Letters Patent.  Patented June 14, 1910.

Application filed March 1, 1910. Serial No. 546,758.

*To all whom it may concern:*

Be it known that I, HENRY HENRICKS, a citizen of the United States, and resident of Valley Park, Missouri, have invented certain new and useful Improvements in Wrenches, of which the following is a specification.

This invention relates to improvements in wrenches and has for its object to provide a wrench with a pair of jaw members arranged to be rapidly adjusted to accommodate the various sizes of articles to which it is to be applied, and locking means for holding the members in their adjusted position.

In the drawings—Figure 1 is a perspective view of my complete invention. Fig. 2 is a sectional view of the same. Fig. 3 is a horizontal cross section taken on the line 3—3 of Fig. 2.

In the construction of my invention I provide a handle member 4 composed of two grip sections 5, the bottom ends thereof being connected together by a trunnion 6. The upper end of said handle section is provided with a jaw 7 and a shank 8. In the shank is provided an elongated rectangular opening 9 through which is inserted the shank 11 of the movable member 12. On the end of the shank 11 is rigidly secured a jaw 13 which corresponds with the jaw 7 of the handle member, and on one surface of the shank 11 is provided a series of teeth 14 with which is adapted to contact a dog 15, said dog being pivotally located between the grip members 5 of the handle section; and on the dog is located a weighted handle 16 which has a tendency to keep the dog in contact with the teeth of the shank 11, at the same time permitting the operator to release the dog when desiring to unlock the wrench from the article to which it has been applied.

The elongated opening 9 in the shank 8 of the handle member is of sufficient length to keep the shank 11 of the member 12 in alinement with the handle member.

In operating my invention the operator, by placing his thumb against the weighted handle 16 raises the dog so as to bring its tooth out of contact with the teeth 14 of the shank 11 and the member 12, can then be withdrawn rapidly and adjusted upon the article to which it is to be applied, and when the same has been adjusted the operator releases the pressure on the weighted handle, which will cause the dog to contact with the teeth.

In the event that the wrench should be applied with the dog suspended at the bottom, the operator will then place the dog in contact with the teeth by means of the thumb, and after the wrench has been applied the same will remain in position by frictional contact.

Having thus fully described my invention, what I claim as new and desire to have secured to me by the grant of Letters Patent, is:

1. A wrench comprising a handle member; a sliding member; a pair of parallel grip sections forming part of the handle member a shank uniting the upper ends of said parallel grip sections; a jaw formed on the shank; a shank provided with a plurality of teeth arranged to operate in the handle section between the parallel grip sections; a jaw formed on the shank to correspond with the jaw of the handle member; and a weighted dog located between the grip sections to communicate with the teeth of the shank, substantially as specified.

2. A wrench comprising a handle composed of two parallel flattened grip members connected together at the top end; a trunnion connecting the lower ends; a perforated jaw formed on the upper end of the handle; a sliding member composed of a shank operating through the perforation and located between the parallel grip sections; a jaw formed on the shank and corresponding with the jaw of the handle; teeth formed on one side of the shank and a weighted dog pivoted between the parallel grip sections, its tooth engaging with the teeth of the shank, substantially as specified.

In testimony whereof, I have signed my name to this specification, in presence of two subscribing witnesses.

HENRY HENRICKS.

Witnesses:
 ALFRED A. EICKS,
 WALTER C. STEIN.